March 3, 1959  E. J. AMDUR ET AL  2,876,321
HUMIDITY RESPONSIVE RESISTOR
Filed April 7, 1958

INVENTOR.
ELIAS J. AMDUR
JOHN C. FOSTER
BY
ATTORNEY

United States Patent Office 2,876,321
Patented Mar. 3, 1959

2,876,321
HUMIDITY RESPONSIVE RESISTOR

Elias J. Amour, St. Louis Park, and John C. Foster, Hopkins, Minn., assignors to Minneapolis-Honeywell Regulator Company, Minneapolis, Minn., a corporation of Delaware Application April 7, 1958, Serial No. 726,873

10 Claims. (Cl. 201—63)

The present invention relates generally to condition responsive devices and more particularly to relative humidity measuring devices. More specifically, the invention contemplates electrical resistance sensitive hygrometers of this type prepared from an ionic salt imprenated ceramic blank.

The prior art techniques for preparation of electrical hygrometer devices of this general type normally employ a hygroscopic ionic salt such as lithium chloride held in a resinous binder and applied as a film on an inert base. Alternatively, this type of salt generally may be impregnated into a porous ceramic base for use at elevated temperatures. Electrical currents are passed through these materials and electrical measurements are accordingly made. Certain inherent limitations exist in these prior art devices, for example, it is impossible to employ these units under conditions of both high and high relative humidity and high temperatures. While the resinous binder-lithium chloride elements may be subjected to atmospheres having high relative humidity, even approaching saturation without harm, these elements are normally unstable and may actually be destroyed upon exposure to high temperatures. On the other hand, ceramic based elements which have been impregnated with a relatively soluble hygroscopic salt such as lithium chloride or the like are normally not suited for use at extremely high relative humidities. These salts when impregnated in a ceramic base device will normally become leached out over a certain period of time while exposed to an atmosphere having a relative humidity approaching saturation. A single element may also be employed to sense relative humidities in a broad range from about 5% to about 95%.

According to the present invention, an aluminum silicate base clay such as kaolin or kaolinite clays is formed into a porous ceramic tile and is impregnated with a relatively insoluble lithium salt such as lithium carbonate or lithium fluoride. The blank is provided with suitably arranged electrodes for making electric contact with the element and for providing a means for making electrical measurements thereon. The completed blank may be subjected to temperatures in the range of 500° C. or greater without detrimental effects. In addition, these hygrometers may be exposed to saturated atmospheres at these relatively high temperatures without experiencing detrimental effects. These units may actually be immersed in boiling water for extended periods of time without losing more than a small part of the salt which has been impregnated therethrough.

Therefore a combined stability at conditions of both high temperature together with high relative humidity is obtained. These elements are highly stable in their operating techniques and require only infrequent calibrations during use. The response time of these units depends on the geometry of the unit, and may be designed to be relatively short. They are adapted for use in extended ranges of relative humidity and temperature. Generally a resistance change of the order of 3 decades occurs due to a relative humidity change of from 10% RH to 95% RH, and the metering problems are accordingly not severe.

It is therefore an object of the present invention to provide ceramic base hygrometers which are stable at high temperatures and high relative humidities.

It is a further object of the present invention to provide improved ceramic base hygrometers which have a rapid response within a wide relative humidity range and wherein a single element may be utilized to measure relative humidities ranging from as low as 10% RH or less up to saturation.

Other and further objects of the present invention will become apparent upon a study of the following specification, appended claims and accompanying drawings, wherein:

Figure 1:
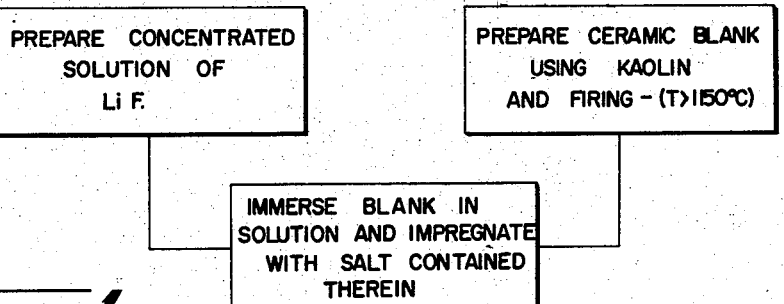
Figure 1 is a schematic drawing illustrating the main steps in the preferred process of the present invention.

According to the preferred modification of the present invention, the ceramic base element is initially prepared. This element has the desired physical size and dimensions of the final product and is provided with a pair of relatively spaced conductive electrodes. The ceramic raw material consists essentially of a hydrated aluminum silicate clay. Accordingly kaolin (also known as bolus alba, china clay, porcelain clay, white bole, argilla or tera alba) or kaolinite may be used. Generally speaking, the kaolin is essentially a hydrate of aluminum silicate, approximately $H_2Al_2Si_2O_8.H_2O$, and kaolinite is essentially a di-hydrate of aluminum silicate, approximately $Al_2O_3.2SiO_2.2H_2O$. For best results it has been found desirable to fire these elements at a temperature in excess of about 1150° C. but below vitrification in order to achieve the desired density and mechanical strength. A soak of at least two hours is normally necessary at this temperature in order to achieve the desired density. These blanks may be fired to a desired mechanical configuration or may be subsequently sawed or otherwise separated from a larger mass of material. One may increase the rate of response of this element by decreasing the physical thickness of the kaolin ceramic. When it becomes desirable to increase the response to a point which renders the blank mechanically weak or unstable, it is desirable to place or form the kaolin ceramic on an inert mounting plate. For example, vycor, quartz or steatite may be employed as supports. In addition, the electrodes may be more closely spaced to speed response time, this being due to a lesser depth of current flow across the inter-electrode area. After the blank has been formed to its desirable size and configuration, electrodes of desirable configuration are applied thereto preferably in the form of an intermeshed arrangement. Such configuration provides a maximum of useable electrode area for a minimum of overall device area.

The completed blank is then immersed in a solution of the lithium salt which is to be impregnated therethrough. Relatively insoluble lithium salts including lithium fluoride and lithium carbonate have been found to be particularly desirable. In this connection, these particular salts appear to form a complex system with the ceramic base and render the hygrometer stable under conditions of either high temperatures or high relative humidity or both. Although the specific conduction mechanism is not known with certainty, it is believed that there is an interaction between the aluminum silicate ceramic and the lithium fluoride or lithium carbonate. This is manifested in particular by the electrical resistance characteristics as a function of relative humidity. For example, this behavior does not resemble either the behavior of the salt, the behavior of the ceramic, or the expected behavior of the composite. This behavior characteristic or response is distinct from these and accordingly is believed to be the result of an interaction between the ceramic and the particular lithium salts. Extended periods of immersion in water after impregnation have been found to be ineffective for leaching out more than a small fraction of these lithium salts.

Lithium chloride, for example, which is not contemplated by the present invention, may be readily leached out of ceramic bodies such as these. The electrical response of lithium chloride impregnated elements, for example, is essentially the response of the salt, and does not appear to be an independent response as obtained with devices prepared in accordance with the present invention.

In order to impregnate the blank, the finished blank is first cleaned of free ionic material by either boiling in distilled water or by electrical treatment. Normally a series of five or six immersions for five minutes each in boiling clean distilled water is adequate. In order to actually impregnate the blank, it is possible to either dip the blank repeatedly in a saturated solution or to boil the blank in a saturated solution for a period of about five minutes. As the dipping method is utilized, it is desirable to place the element in the salt solution for several minutes after which the impregnated element is removed and dried in an atmosphere of from 70° to 100° C. This dipping and drying process is repeated five or six times.

These elements normally require an aging time of one to two months to reach stability. In this connection, the elements are preferably aged (storing in a room temperature atmosphere of about 60%–95% RH). Of course, shorter aging periods may be utilized by increasing either the temperature employed (preferably less than 100° C.) or by increasing the relative humidity.

In order to more particularly point out the various features of the present invention, a specific example is presented below.

EXAMPLE 1

Preparation of ceramic bases

To pure Pioneer kaolin, 3% methocel and 125% distilled water were added. The kaolin, methocel and water were ball milled for a period of about two hours in order to disperse the methocel through the kaolin. After milling, the kaolin slip was placed in a drying tray at 110° C. It is preferred that the drying temperatures not exceed 120° C. at which point the methocel begins to scorch and render a darkened finished product. The dried product was then crushed in a jaw crusher and pulverized in a mikro-sample mill using the coarse screen. A coarse particle size distribution is generally necessary in good pressing techniques. A finer particle size does not allow the air to escape from the pressing die. Square tiles 2 inches on the side by $\frac{1}{16}$ inch thick were pressed under a pressure of 10,000 p. s. i. Inasmuch as the kaolin prepared up to this point included only negligible moisture, no drying was necessary before firing. If moisture is present, tiles should be dried prior to firing. The tiles were set three high on zirconia sand on silicon carbide setters and fired at a temperature of about 1200° C. using a two hour soak at the peak temperature. They were then cut to size, 1½ inches on the side and $\frac{1}{16}$ inch thick. Higher firing temperatures, below vitrification, may be utilized if desired, however firing temperatures below about 1200° C. generally result in a product having poor mechanical strength.

Conductive electrodes or grids were then prepared on the ceramic elements. This was accomplished by silk screening with conductive silver paste. The configuration included an intermeshed comb arrangement having a pair of parallelly disposed legs and yielded between 22 and 23 inches of electrode edges, the distance between the leg pairs being 0.02 inch. It is important that the silver silk screen paste used in this operation not be permitted to smear and effectively short out the grids. The completed blanks were cleaned by means of immersion in boiling distilled water. Five changes of water with five minutes of exposure to each change of water was sufficient to free the blanks of undesirable ionic impurities. The blanks were then ready to be impregnated with salt.

Impregnation of the ceramic blank

The blanks were placed in a vessel containing a saturated solution of lithium fluoride heated to boiling. The elements were immersed therein and permitted to boil for a period of about five minutes.

The elements were then aged by storing at room temperature in a relative humidity of 60% RH for 1 month. This aging stabilizes the resistive characteristics of the element.

Figure 3:
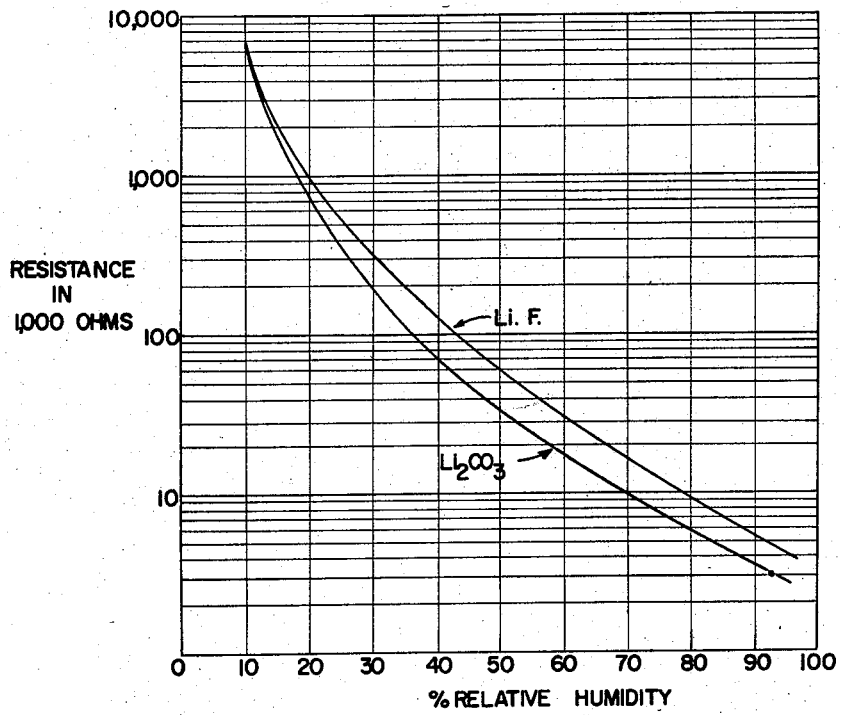
Figure 3 is a graph showing the electrical resistance versus relative humidity of typical hygrometer elements prepared in accordance with the present invention.

Attention is now directed to Figure 3 of the drawing illustrating a typical response curve in accordance with Example 1.

EXAMPLE 2

Ceramic blanks were prepared in accordance with the procedures set forth in Example 1 above. The units were impregnated with lithium carbonate in the following manner.

The blanks were placed in a vessel containing a saturated solution of lithium carbonate heated to boiling. The elements were immersed therein and permitted to boil for a period of about five minutes.

The impregnated elements were then aged by storing at room temperature in an atmosphere of about 95% RH, for 30 days. This aging stabilizes the resistive characteristics of the element.

A typical response curve for an element prepared as above indicated is shown in Figure 3 of the drawings.

Figure 2:
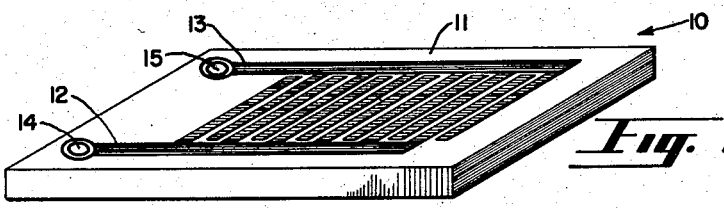
Figure 2 is a perspective view of a hygrometer element prepared in accordance with the present invention.

Figure 2 illustrates a typical element prepared in accordance with Examples 1 and 2 above. In this connection, the element generally designated 10 includes a kaolin ceramic base 11 having a pair of intermeshed grid electrodes 12 and 13 thereon. Suitable electrical contact sleeves 14 and 15 provide for convenience of introduction into an appropriate electrical circuitry arrangement.

If desired, other configurations such as hollow ceramic sleeves or the like may be employed.

Other and further modifications of the present invention will become apparent to those skilled in the art and will therefore be appreciated that these specifically given herewith and for purposes of illustration are not to be construed as limitations upon the scope of this application.

We claim as our invention:

1. Condition responsive apparatus electrically sensitive to relative humidity comprising; a fired ceramic base having relatively spaced electrodes arranged along a surface thereof and impregnated with a relatively insoluble lithium salt, said ceramic base consisting chiefly of aluminum silicate and said lithium salt being selected from the group consisting of lithium fluoride and lithium carbonate.

2. Condition responsive apparatus electrically sensitive to relative humidity comprising; a fired ceramic base having relatively spaced electrodes arranged along a surface thereof and impregnated with a relatively insoluble lithium salt, said ceramic base consisting chiefly of kaolin clay and said lithium salt being selected from the group consisting of lithium fluoride and lithium carbonate.

3. Condition responsive apparatus electrically sensitive to relative humidity comprising; a fired ceramic base having relatively spaced electrodes arranged along a surface thereof and impregnated with lithium fluoride, said ceramic base consisting chiefly of aluminum silicate.

4. An electrical hygrometer comprising; a fired ceramic film supported on an inert base, said ceramic film having relatively spaced electrodes arranged along a surface thereof and impregnated with a relatively insoluble lithium salt, said ceramic base consisting chiefly of kaolin clay and said lithium salt being selected from the group consisting of lithium fluoride and lithium carbonate.

5. The method of preparing an electrical hygrometer which comprises the steps of forming a slip consisting chiefly of aluminum silicate, forming a blank therefrom by firing said slip at a temperature exceeding about 1150° C., but below vitrification, and impregnating said fired blank with aqueous solution of a relatively insoluble lithium salt selected from the group consisting of lithium fluoride and lithium carbonate.

6. The method of preparing an electrical hygrometer which comprises the steps of forming a slip consisting chiefly of aluminum silicate, forming a blank therefrom by firing said slip at a temperature exceeding about 1150° C., but below vitrification, impregnating said fired blank with aqueous solution of a relatively insoluble lithium salt selected from the group consisting of lithium fluoride and lithium carbonate and aging said hygrometer at room temperature and at a relative humidity of about 60% to 95% for a period of at least one month.

7. The method of preparing an electrical hygrometer which comprises the steps of forming a slip consisting chiefly of kaolin clay, forming a blank therefrom by firing said slip at a temperature exceeding about 1150° C., and below the vitrification temperature for a period in excess of about two hours, impregnating said fired blank with aqueous solution of a relatively insoluble lithium salt selected from the group consisting of lithium fluoride and lithium carbonate.

8. The method of preparing an electrical hygrometer which comprises the steps of forming a slip consisting chiefly of aluminum silicate, forming a blank therefrom by firing said slip at a temperature exceeding about 1150° C. but below the vitrification temperature thereof, impregnating said fired blank with aqueous solution of a relatively insoluble lithium salt selected from the group consisting of lithium fluoride and lithium carbonate, by immersion of said fired blank in a saturated boiling aqueous solution of said lithium salt for a period in excess of about five minutes.

9. The method of preparing an electrical hygrometer which comprises the steps of applying a relatively thin film of kaolin clay on an inert base, firing said film at a temperature exceeding about 1150° C. but below vitrification temperature for a period exceeding about two hours, and impregnating said fired film with an aqueous solution of a relatively insoluble lithium salt selected from the group consisting of lithium fluoride and lithium carbonate.

10. In the electrical hygrometer including an inert base having a sensitive surface film thereon which is responsive to relative humidity and which has means for passing an electrical current across a portion thereof, said hygrometer being characterized in that the sensitive film is a fired kaolin clay impregnated with a relatively insoluble lithium salt selected from the group consisting of lithium fluoride and lithium carbonate.

No references cited.